United States Patent
Saitou et al.

(10) Patent No.: US 7,219,111 B2
(45) Date of Patent: May 15, 2007

(54) NUMERIC VALUE SEARCH APPARATUS AND NUMERIC VALUE SEARCH METHOD

(75) Inventors: Takuya Saitou, Musashino (JP); Yoshinobu Sugihara, Musashino (JP); Shigeru Takezawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 708 days.

(21) Appl. No.: 10/663,711

(22) Filed: Sep. 17, 2003

(65) Prior Publication Data
US 2004/0064490 A1    Apr. 1, 2004

(30) Foreign Application Priority Data
Sep. 26, 2002  (JP)  ............................. 2002-280192
May 28, 2003  (JP)  ............................. 2003-150219

(51) Int. Cl.
*G06F 7/00* (2006.01)
(52) U.S. Cl. ....................................... 708/202
(58) Field of Classification Search ................. 708/202
See application file for complete search history.

(56) References Cited

U.S. PATENT DOCUMENTS

| | | | | | |
|---|---|---|---|---|---|
| 4,441,165 | A | * | 4/1984 | Coleman et al. | 708/207 |
| 4,713,786 | A | * | 12/1987 | Roskind | 708/202 |
| 5,138,567 | A | * | 8/1992 | Mehrgardt | 708/304 |
| 5,144,568 | A | * | 9/1992 | Glover | 708/202 |
| 5,900,006 | A | * | 5/1999 | Yoon | 708/202 |
| 6,018,750 | A | * | 1/2000 | Connell et al. | 708/202 |
| 6,115,727 | A | * | 9/2000 | Schooler et al. | 708/304 |
| 6,748,405 | B2 | | 6/2004 | De Tremiolles et al. | |
| 2001/0013048 | A1 | | 8/2001 | Imbert de Tremiolles et al. | |

FOREIGN PATENT DOCUMENTS

| | | |
|---|---|---|
| JP | 62-109171 A | 5/1987 |
| JP | 7-160726 | 6/1995 |
| JP | 2001-236207 A | 8/2001 |

* cited by examiner

*Primary Examiner*—D. H. Malzahn
(74) *Attorney, Agent, or Firm*—Westerman, Hattori, Daniels & Adrian, LLP.

(57) ABSTRACT

The objective is to realize a numeric value search apparatus and numeric value search method capable of rapidly searching for a numeric value of a prescribed rank.

The present invention is characterized in that it comprises the following: a storage unit which stores multiple pieces of digitized numeric value data; a resolution specifying means which specifies a frequency distribution resolution; a frequency distribution creation unit which determines the frequency distribution of numeric value data in the storage unit using the resolution specified by this resolution specifying means; and a computation unit which determines the numeric value range or numeric value with the prescribed rank from the frequency distribution determined by this frequency distribution creation unit; wherein the resolution specifying means increases the resolution specified to the frequency distribution creation unit in steps, based on the computation results of the computation unit.

16 Claims, 13 Drawing Sheets

The median is the numerical value data corresponding to the count value holding means $C_m$, where $(N+1) \leq C_{d0}$ or $C_{d0} + C_{d1} + ... + C_{d(m-1)} < (N+1) \leq C_{d0} + C_{d1} + ... + C_{d(m-1)} + C_{dm}$.

FIG.6

| | Create frequency distribution (read and count) | Cumulative value computation | Total |
|---|---|---|---|
| Device shown in FIG.2 | 1001 times × 2 | 65,535 times | 67,537 times |
| Device shown in FIG.4 | (1001 times × 2) × 4 | 15 times × 4 times | 8068 times |

FIG.11

Create cumulative count distribution with resolution of first four bits

| Numerical value range (HEX) | Count value holding means |
|---|---|
| 0000~0FFF | C0 |
| 0000~1FFF | C1 |
| 0000~2FFF | C2 |
| 0000~3FFF | C3 |
| 0000~4FFF | C4 |
| 0000~5FFF | C5 |
| 0000~6FFF | C6 |
| 0000~7FFF | C7 |
| 0000~8FFF | C8 |
| ... | ... |
| 0000~EFFF | C14 |
| 0000~FFFF | C15 |

Create frequency distribution with higher resolution for range of numerical values where median exists Create cumulative count distribution with resolution of first eight bits for range of numerical values where median exists

| Numerical value range (HEX) | Count value holding means |
|---|---|
| 0000~70FF | C0 |
| 0000~71FF | C1 |
| 0000~72FF | C2 |
| 0000~73FF | C3 |
| 0000~74FF | C4 |
| 0000~75FF | C5 |
| 0000~76FF | C6 |
| 0000~77FF | C7 |
| 0000~78FF | C8 |
| ... | ... |
| 0000~7EFF | C14 |
| 0000~7FFF | C15 |

NUMERIC VALUE SEARCH APPARATUS AND NUMERIC VALUE SEARCH METHOD

BACKGROUND OF THE INVENTION

1. Field of the Invention

The present invention pertains to a numeric value search apparatus and numeric value search method for searching for numeric values of a prescribed rank among multiple digitized numeric value data; and pertains in particular to a numeric value search apparatus and numeric value search method that enable searching for numeric values of a prescribed rank at high speed.

2. Description of the Prior Art

Numeric value data of a prescribed rank from the smallest value, together with mean values, maximum values, and minimum values, are often used in analysis and statistics on numeric value data groups comprised of finite parameters. In particular, the piece of numeric value data with the very middle rank in a numeric value data group is called a median, and may be more useful than a mean value. For example, if a parameter's numeric value data group contains extremely abnormal values, the mean value will be affected by the abnormal values, but the median will not be easily affected.

If the number of parameters is odd, the piece of numeric value data at the ((parameters+1)/2)th place is the median; if the number of parameters is even, then the mean value of the numeric value data at the (parameters/2)th position and the numeric value data at the (parameters/2+1)th position is the median.

In addition, there are numerous methods for searching for medians. The simplest methods include searching for the median by sequentially comparing all numeric value data and rearranging them in ascending order (see, for example, Japanese Laid-open Patent Application 7[1995]-160726 (pages 2–3)), and searching for the median directly.

FIG. 1 illustrates an example configuration for a conventional numeric value search apparatus, which searches for the median directly. In FIG. 1, the memory 10 is a storage unit in which nine pieces of numeric value data d1 through d9 are stored in sequence starting at the first position. Of course, the memory 10 could store a desired number of pieces of numeric value data greater than d1 through d9, but the number is set as nine in order to simplify the explanation. A comparison means 11 reads the numeric value data d1 through d9 from the memory 10 and outputs the median.

The operations of this type of apparatus will now be described below. The comparison means 11 reads the numeric value data d1 which is stored at the first position in the memory 10. It then sequentially reads the numeric value data, d2 through d9, other than the numeric value data d1 (which it has read), comparing them against the numeric value data d1. If there are four pieces of numeric value data, among d2 through d9, which are greater than (or less than) the numeric value data d1, that numeric value data d1 is output as the median.

In this case, if the numeric value data d1 is not the median, then the comparison means 11 reads the numeric value data d2 which is second from the first position of the memory 10. It then sequentially reads the numeric value data, d1 and d3 through d9, other than the numeric value data d2 (which it has read), comparing them against the numeric value data d2. If there are four pieces of numeric value data, among d1 and d3 through d9, which are greater than (or less than) the numeric value data d2, that numeric value data d2 is output as the median.

Next, if the numeric value data d2 is not the median, comparisons are performed in the same manner thereafter on the remaining numeric value data d3 through d9, to determine whether they are the median. Next, the found medians are displayed on a screen (not shown) or output to an external apparatus (not shown).

With this type of apparatus, in order to search for the numeric value data at the (N+1)th position, which is the median, among a number (2N+1) (where N is a positive integer) of parameters, numeric value data readings and comparisons are performed (N×N) times in the worst case, and ((N×N)/2) times on average. If, for example, there are nine parameters, then 16 readings and comparisons are required in the worst case; however, 250,000 are required in the worst case if there are 1001 parameters. Thus, as the number of parameters increases, the time required for searching increases markedly, which has been a problem.

In addition, if analog amounts are digitized for use as numeric value data, the number of pieces of these numeric value data typically increases tremendously in many cases at present, as, for example, in waveform measurement apparatuses such as digital oscilloscopes.

In addition, because searching for a median with the apparatus shown in FIG. 1 is too time consuming, search methods employing frequency distributions (count distributions) are often used. This method focuses on the fact that analog amounts are digitized by, for example, an analog-digital converter and are stored in memory as numeric value data. Specifically, it searches for a median in a frequency distribution, focusing on the fact that the range and resolution of values that can be taken by numeric value data stored in memory are finite.

FIG. 2 is a figure which illustrates an example configuration of a conventional numeric value search apparatus in which such frequency distributions are used. In FIG. 2, the memory 20 is a storage apparatus in which are stored 1001 pieces of digitized numeric value data. Of course, the memory 20 could store a desired number of pieces of numeric value data, but the number is set as 1001 in order to simplify the explanation. The numeric value data are digitized with a resolution of 8 bits ($2^8$=256), and the number of different numeric value data values which may be taken is 256. An example of a numeric value data range is the integers from 0 to 255.

A frequency distribution creation unit 30, comprising a counting means 31 and data count region 32, reads the numeric value data of the memory 20 and creates a frequency distribution with the same resolution as that in which the numeric value data were digitized. The counting means 31 increments or clears the corresponding data count region 32 count value based on the numeric value data read from the memory 20. The data count region 32 comprises 256 count value holding means, C0 through C255, which have the same resolution as that in which the numeric value data were digitized; they are counted or cleared by the counting means 31, and hold count values.

A computation unit 40 computes the median from the count values of the count value holding means C0 through C255 in the data count region 32 of the frequency distribution creation unit 30.

The operations of such an apparatus will now be described.

The counting means 31 clears to "0" all of the count values of the count value holding means C0 through C255 of the data count region 32. Next, the counting means 31 sequentially reads the numeric value data from the memory 20, and increments the count value in the count value holding means C0 through C255 which corresponds to the read numeric value data. For example, if the numeric value data is "8", then the value of the count value holding means C8 is incremented; if the numeric value data is "255", then the value of the count value holding means C255 is incremented.

In this case, if the count values of the count value holding means C0 through C255 when the counting means 31 finishes counting all of the numeric value data in the memory 20, i.e., their frequencies, are respectively Cd0 through Cd255, then the frequency distribution is represented by the histogram shown in FIG. 3. FIG. 3 is a histogram representing the frequency distribution created by the frequency distribution creation unit 30. In FIG. 3, the count value holding means C0 through C255 are on the horizontal axis, and the frequencies (count values) are on vertical axis.

Next, the computation unit 40 sequentially reads the count values Cd0 through Cd255 of the count value holding means C0 through C255, accumulates them, and computes the median. Specifically, as is apparent from the histogram shown in FIG. 3, the numeric value data, corresponding to the count value holding means Cm (where m is a natural number such that $1 \leq m \leq 255$) satisfying equation (1) below, is the median, which is at the (N+1)th place in the (2N+1) pieces of numeric value data.

$$(N+1) \leq Cd0$$

or $$Cd0+Cd1+ \ldots +Cd(m-1)<(N+1) \leq Cd0+Cd1+ \ldots + Cd(m-1)+Cdm \quad (1)$$

Accordingly, even if the number of pieces of parameter numeric value data is numerous at 1001 pieces, in the search by the numeric value search apparatus shown in FIG. 2, there are 1001 readings, 1001 incrementings by the data count region 32, and the computation unit 40 performs reading and accumulation 255 times at worst. Thus if the frequency distribution creation resolution is p (where p is a natural number), then the number of executions of reading, writing, accumulation and the like is expressed as $(2\times(2N+1)+(2^p-1))$, and even if the number of parameters increases, the time required for searching will never increase exponentially in comparison to the numeric value search apparatus shown in FIG. 1.

This type of median search is also used in waveform measurement apparatuses. A waveform measurement apparatus digitized a measured waveform (analog amount) by means of an analog/digital converter to change it to numeric value data; stores it in the memory 20; and furthermore performs prescribed processes and analysis based on the numeric value data stored in the memory 20 and displays the waveform.

If, for example, multiple waveform measurements are taken using a trigger signal as a reference signal, then in order to reduce the effects of noise, it may be better to use a median than to determine a mean value in the numeric value data occurring at the same time from the trigger signal. Of course, the number of pieces of digitized numeric value data is enormous, but it is necessary to collect as much data as possible on the rapidly changing measured waveforms without downsampling. For this reason, the apparatus shown in FIG. 2 is used to perform the median search as rapidly as possible.

However, in recent years, there has been an increase in the resolution when analog amounts are digitized. In addition, in waveform measurement apparatuses, even if the resolution during digitization is 8 bits, it has become common for the resolution to have more bits for reasons related to numeric value data processing, or as a result of numeric value data processing. For example, in some cases the resolution is 16 bits ($2^{16}$=65,536).

With such resolutions, the computation of the cumulative value by the computation unit 40 after creation has become more influential than the frequency distribution created by the frequency distribution creation unit 30, with respect to the median search. Specifically, the computation unit 40 reads and accumulates the count value from the data count region 32, which comprises 65,536 count value holding means having a resolution which is the same as that at which the numeric value data were digitized. Because of this, the required computation time is 65,535 times in the worst case, and 32,768 times even on average. Thus even if the parameters creating the frequency distribution are constant, if the resolution increases, the cumulative computation of the computation unit 40 increases, making the median search extremely time-consuming, which has been a problem.

SUMMARY OF THE INVENTION

The purpose of the present invention is to realize a numeric value search apparatus and numeric value search method capable of rapidly searching for a numeric value of a prescribed rank.

BRIEF DESCRIPTION OF THE DRAWINGS

FIG. 6 is a diagram showing the numbers of executions in the apparatus shown in FIG. 2 and the conventional apparatus shown in FIG. 4.

FIG. 11 is a diagram illustrating an example of correspondences between the numeric value range of the apparatus shown in FIG. 10, and the count value holding means C0 through C15.

DETAILED DESCRIPTION OF THE PREFERRED EMBODIMENTS

Embodiments of the present invention are described below using the diagrams.

First Embodiment

Figure 1:
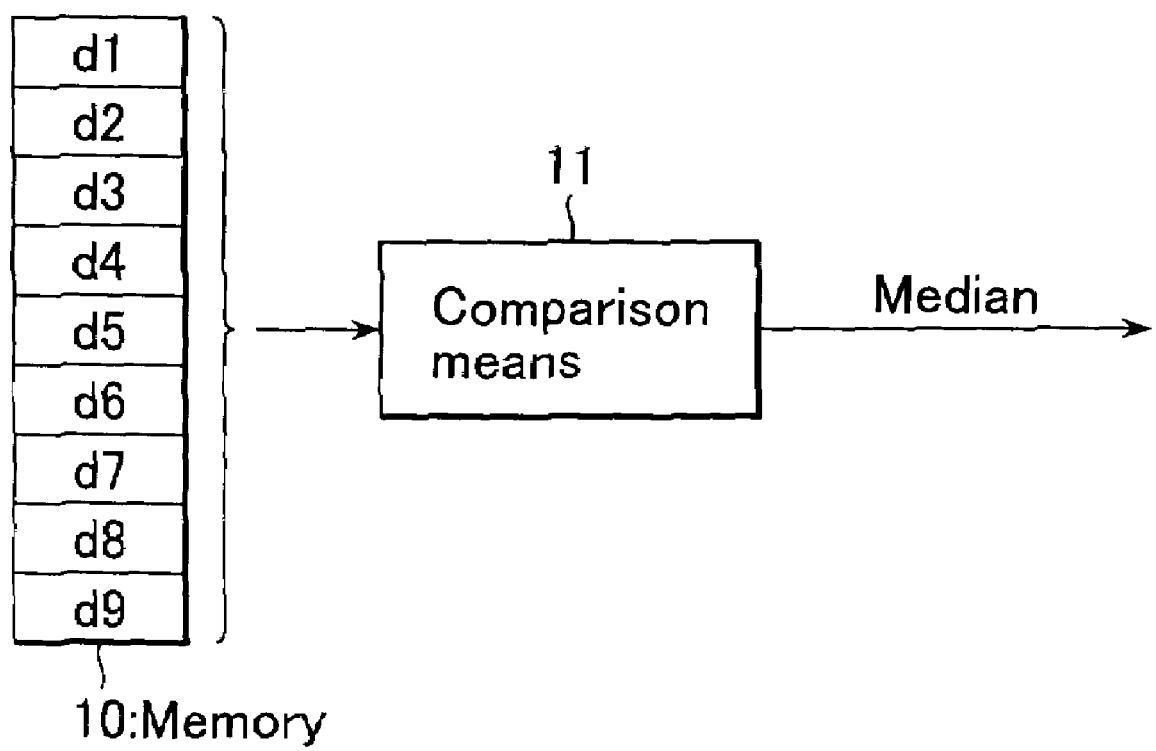
FIG. 1 is a block diagram illustrating a first configuration of a conventional numeric value search apparatus.
Figure 2:
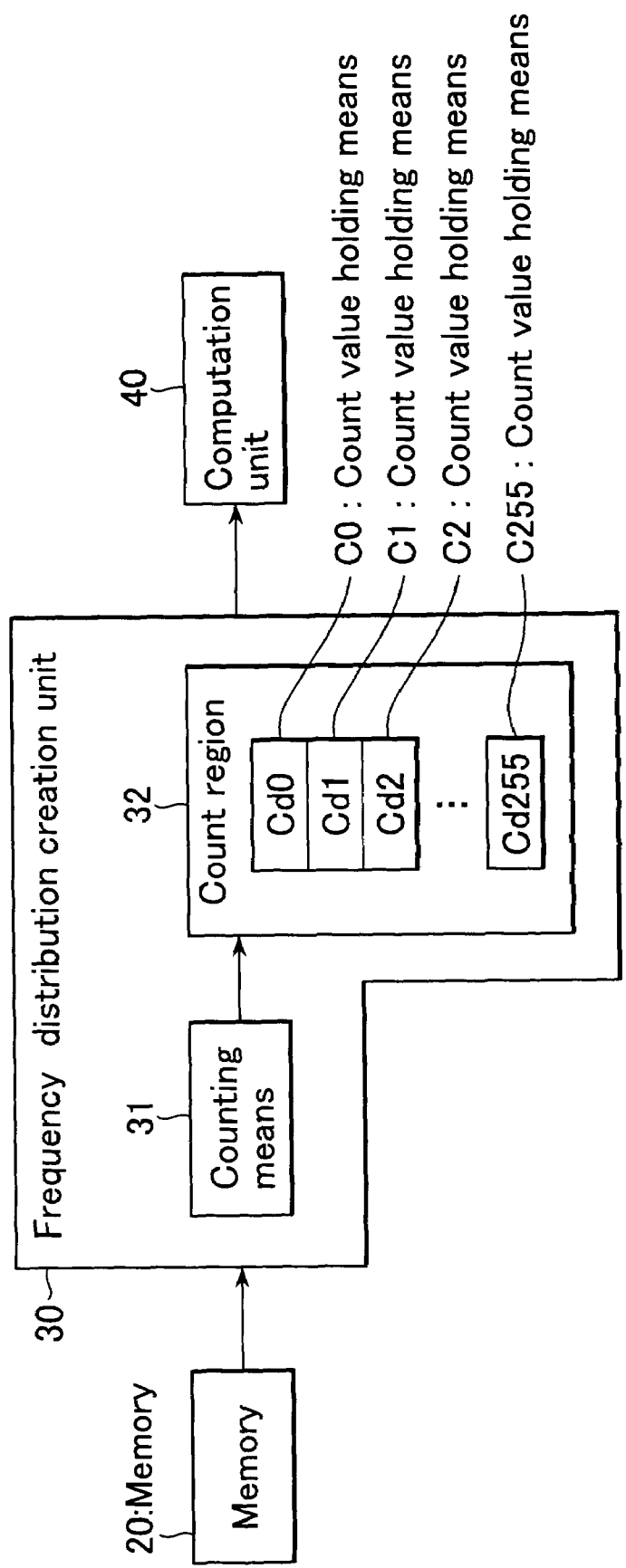
FIG. 2 is a block diagram illustrating a second configuration of a conventional numeric value search apparatus.
Figure 3:
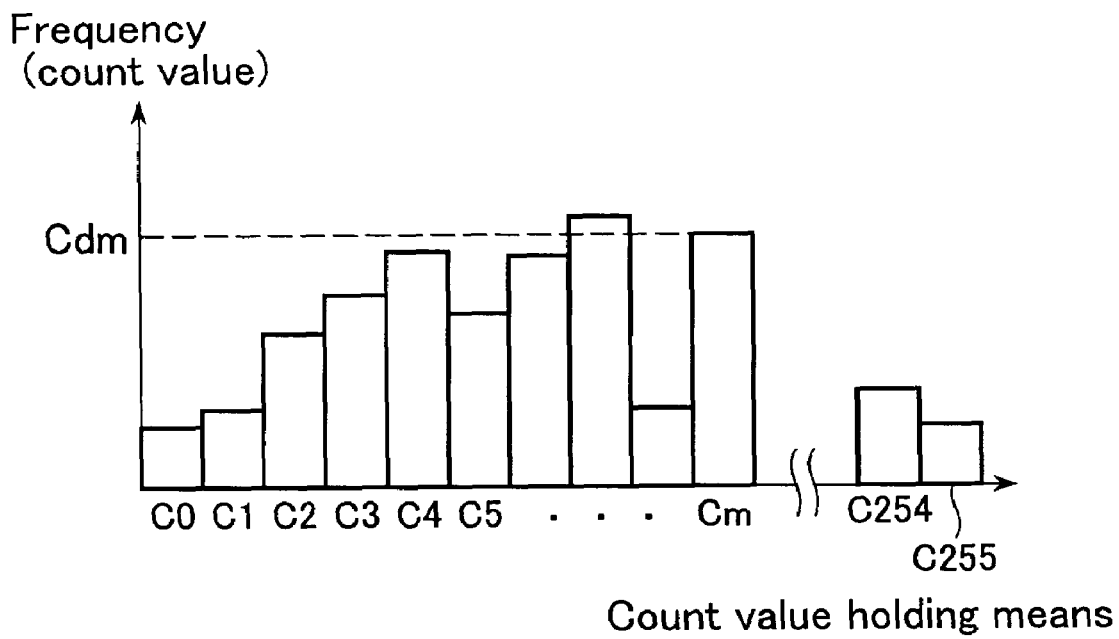
FIG. 3 is a diagram illustrating an example of a histogram.
Figure 4:
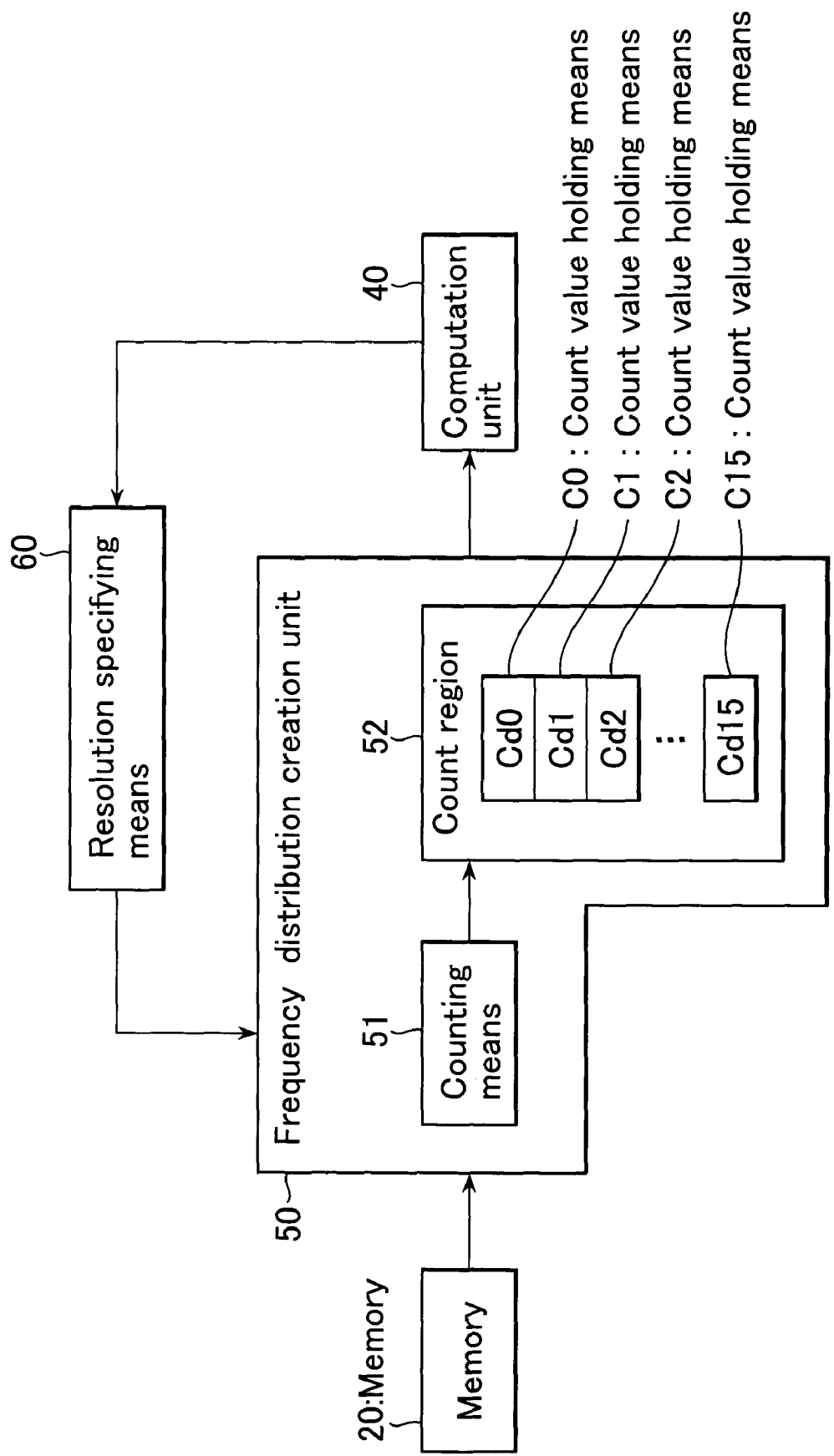
FIG. 4 is a block diagram illustrating a first embodiment of the present invention.

FIG. 4 is a block diagram illustrating a first embodiment of the present invention. In this case, areas which are the same as in FIG. 2 are denoted by identical symbols and are not described. In FIG. 4, the memory 20 stores numeric value data that have been digitized at a resolution of 16 bits; the number of different numeric value data values which may be taken is 65,536. An example of a numeric value data range is the integers from 0 to 65,535.

A frequency distribution creation unit 50, comprising a counting means 51 and data count region 52, is disposed in lieu of the frequency distribution creation unit 30. It reads numeric value data from the memory 20 at a specified resolution and creates a frequency distribution (count distribution). The counting means 51 increments or clears the corresponding data count region 52 count value based on the numeric value data read from the memory 20. The data count region 52 comprises a number of count value holding means, C0 through C15, such as 16, corresponding to the specified resolution; they are counted or cleared by the counting means 51, and hold count values.

A computation unit 40 computes the median by cumulative computation from the count values of the count value holding means C0 through C15 in the data count region 52 of the frequency distribution creation unit 50. A resolution specifying means 60 specifies, to the frequency distribution creation unit 50, the resolution for creating the frequency distribution based on the median determined by the computation unit 40.

The operations of such an apparatus will now be described.

The counting means 51 clears to "0" all of the count values of the count value holding means C0 through C15 of the data count region 52. After the clearing, the resolution specifying means 60 instructs the frequency distribution creation unit 50 to create the first frequency distribution at a resolution of, for example, the first four bits in the numeric value data.

Figure 5:
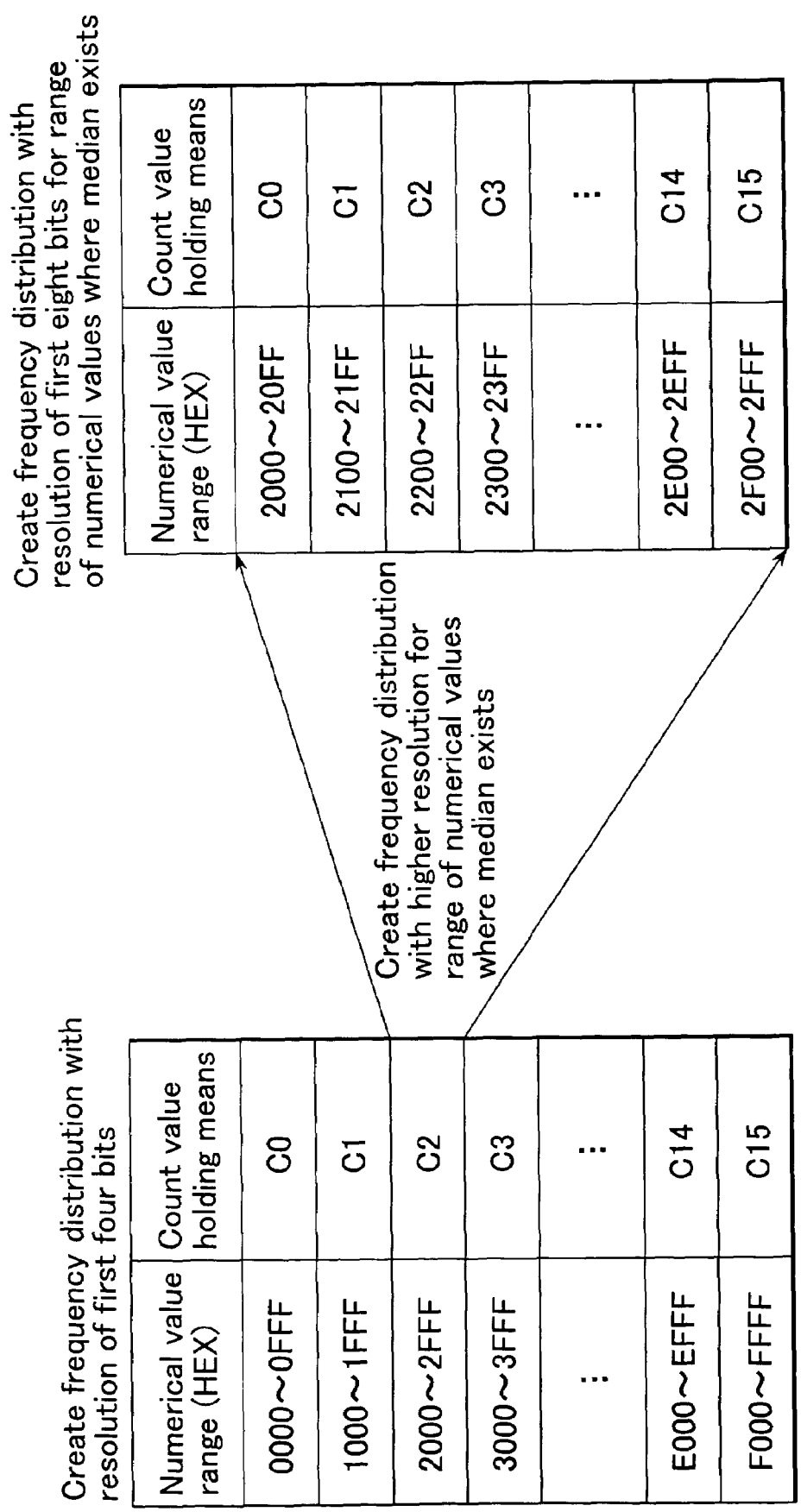
FIG. 5 is a diagram illustrating an example of correspondences between the numeric value range of the apparatus shown in FIG. 4, and the count value holding means C0 through C15.

Next, the frequency distribution creation unit 50, following the instruction from the resolution specifying means 60, assigns a numeric value range to the count value holding means C0 through C15 of the data count region 52, after which the counting means 51 of the frequency distribution creation unit 50 reads the numeric value data from the memory 20 and increments a count value of the count value holding means C0 through C15 of the data count region 52 in the resolution of the specified first four bits, as shown in FIG. 5. FIG. 5 is a diagram illustrating the numeric value range (level width) for creating the frequency distribution at the resolution specified by the resolution specifying means 60, as well as the count value holding means C0 through C15 corresponding to the numeric value range.

Specifically, the counting means 51 increments the count value holding means C0 for numeric value data in the range of 0000(16) to 0FFF(16) (numeric value data are shown in hexadecimal notation); increments the count value holding means C1 for numeric value data in the range of 1000(16) to 1FFF(16); increments the count value holding means C2 for numeric value data in the range of 2000(16) to 2FFF(16); and thereafter in the same manner increments the count value holding means C15 for numeric value data in the range of F000(16) to FFFF(16).

In this manner, the counting means 51 increments the count values of the count value holding means C0 through C15 of the data count region 52 corresponding to the numeric value data read from the memory 20, and creates a frequency distribution based on all of the numeric value data. Thereafter, the computation unit 40 searches for the median using equation (1), and the range of, for example, 2000(16) to 2FFF(16), corresponding to the count value holding means C2, is output to the resolution specifying means 60 as the median. Note that the range of m in equation (1) is $1 \leq m \leq 15$, due to the count value holding means C0 through C15.

Next, the resolution specifying means 60 raises the resolution another 4 bits in the range 2000(16) to 2FFF(16) of numeric values containing the median, and instructs the frequency distribution creation unit 50 to create a second frequency distribution with a resolution of the first 8 bits.

Accordingly, the frequency distribution creation unit 50 assigns a numeric value range to the count value holding means C0 through C15 of the data count region 52. Next, the counting means 51 of the frequency distribution creation unit 50 clears the count values of the count value holding means C0 through C15, then reads the numeric value data from the memory 20 and increments the count values of the count value holding means C0 through C15 of the data count region 52 in the specified resolution of the first 8 bits.

Specifically, the counting means 51 increments the count value holding means C0 for numeric value data in the range of 2000(16) to 20FF(16); increments the count value holding means C1 for numeric value data in the range of 2100(16) to 21FF(16); increments the count value holding means C2 for numeric value data in the range of 2200(16) to 22FF(16); and thereafter in the same manner increments the count value holding means C15 for numeric value data in the range of 2F00(16) to 2FFF(16).

After the frequency distribution is again created based on all of the numeric value data in this manner, the computation unit 40 searches for the median using equation (1), and outputs the found numeric value range to the resolution specifying means 60 as a median.

Of course, the numbers of pieces of numeric value data counted by the count value holding means C0 through C15 the first time and second time differ (the first time, all numeric value data stored in the memory 20 are covered; the second time, the numeric value data in the numeric value range 2000(16) to 2FFF(16) are covered). Prior to performing the computation in equation (1), the computation unit 40 should add all the count values of the count value holding means C0 through C15 and determine the number of pieces of numeric value data in the numeric value range 2000(16) to 2FFF(16), then from this number of pieces determine the (N+1)th place, to which the median corresponds.

Next, the resolution specifying means 60 raises the resolution another 4 bits in the range of numeric values containing the median, and instructs the frequency distribution creation unit 50 to create a third frequency distribution with a resolution of the first 12 bits.

Thereafter, in the same manner the frequency distribution creation unit 50 creates a frequency distribution in the specified resolution of the first 12 bits. Next, the computation unit 40 searches for the median, and outputs the found numeric value range to the resolution specifying means 60 as a median.

Accordingly, the resolution specifying means 60 raises the resolution of the numeric value range containing the median another 4 bits, and instructs the frequency distribution creation unit 50 to create a fourth frequency distribution in a resolution of 16 bits, which is the same as that in which the numeric value data were digitized. Next, the frequency distribution creation unit 50 creates a frequency distribution in 16-bit resolution. The computation unit 40 then searches for the median in this frequency distribution, and displays the found median on a screen (not shown), or outputs it to an external apparatus (not shown).

FIG. 6 shows the numbers of executions required to search for the median with this type of apparatus, as well as with the apparatus shown in FIG. 2. With the apparatus shown in FIG. 4, memory 20 reading is performed 1001 times; data count region 52 incrementing is performed 1001 times, and reading and accumulation by the computation unit 40 are performed 15 times in the worst case. In addition, this series of operations is performed 4 times, resulting in a total of 8068 times as shown in FIG. 6. Thus it is possible to maintain a much smaller number of executions than the 67,537 times of the apparatus shown in FIG. 2.

Thus the resolution specifying means 60 specifies, to the frequency distribution creation unit 50, a resolution which is lower than the resolution of the numeric value data stored in the memory 20, and the frequency distribution creation unit 50 creates a frequency distribution using this specified resolution. Next, the computation unit 40 determines the median from this frequency distribution. In addition, the resolution specifying means 60 again specifies, to the frequency distribution creation unit 50, a resolution which is increased based on the computation results of the computation unit 40. The frequency distribution is repeatedly created to determine the median until the resolution is the same as that of the numeric value data. Therefore, it is possible to suppress an increase in the number of median search executions, even if the numeric value data resolution is high. Accordingly, it is possible to search for the median rapidly.

For example, in a waveform measurement apparatus which digitizes a measured waveform, converts it to numeric value data, and then performs prescribed waveform analysis and waveform processing, the capacity of the memory 20 which stores the numeric value data is a prescribed amount, and the number of pieces of numeric value data that can be stored is fixed. However, because it is possible to rapidly search for the median in the numeric value data of the memory 20, it is difficult for the memory 20 to reach full capacity, and it is possible to perform continuous waveform measurements without interruptions.

In addition, because the count value holding means C0 through C15 in the data count region 52 do not need to be of a quantity commensurate with the numeric value data resolution ($2^{16}$=65,536), it is possible to reduce the data count region 52. Accordingly, it is possible to reduce size and minimize costs.

Second Embodiment

Figure 7:
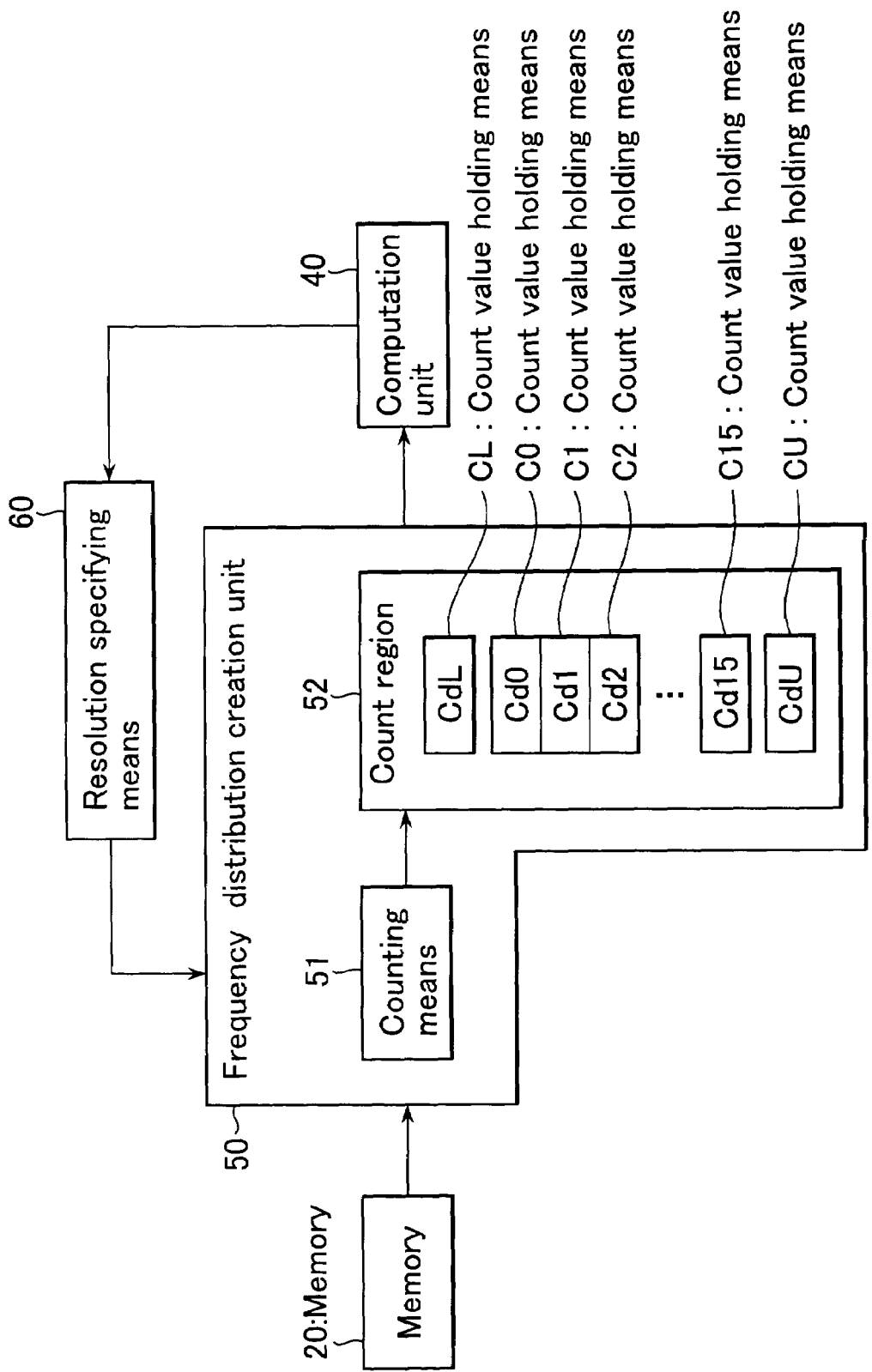
FIG. 7 is a block diagram illustrating a second embodiment of the present invention.

FIG. 7 is a block diagram illustrating a second embodiment of the present invention. In this case, areas which are the same as in FIG. 4 are denoted by identical symbols and are not described. In FIG. 7, count value holding means CL and CU are disposed in the data count region 52 of the frequency distribution creation unit 50. They are counted or cleared by the counting means 51, and hold count values.

The operations of this type of apparatus will now be described.

This type of apparatus is nearly the same as the apparatus shown in FIG. 4 in terms of operations. The difference in terms of operations is that in the creation of the second and subsequent frequency distributions, after the count values of the count value holding means C0 through C15, CL, and CU are cleared, the counting means 51 increments the count value holding means CL if the numeric value data read from the memory 20 are less than the previously determined numeric value range containing the median; and increments the count value holding means CU if they are greater than the previously determined numeric value range containing the median.

Figure 8:
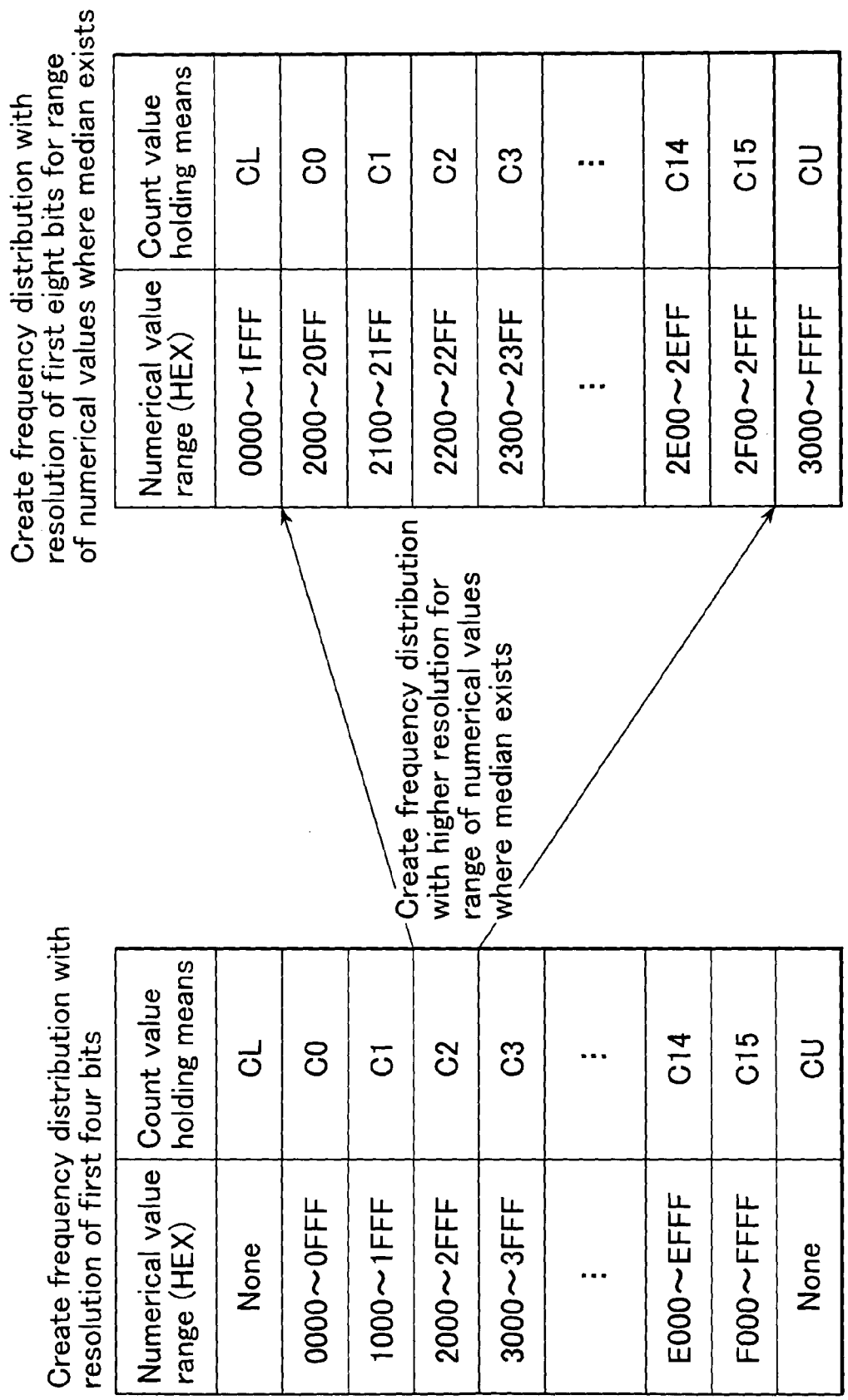
FIG. 8 is a diagram illustrating an example of correspondences between the numeric value range of the apparatus shown in FIG. 7, and the count value holding means C0 through C15, CL, and CU.

Specifically, as shown in FIG. 8, in the creation of the first frequency distribution, the counts CL and CU are not incremented. However, in the second and subsequent times, the counting means 51 increments the count value holding means CL for numeric value data in the range of 0000(16) to 1FFF(16), and increments the count value holding means CU for numeric value data in the range of 3000(16) to FFFF(16). In this case, FIG. 8 is a diagram illustrating the numeric value ranges for creating the frequency distribution at the resolutions specified by the resolution specifying means 60, as well as the count value holding means C0 through C15, CL, and CU, which correspond to the numeric value ranges.

Next, after the frequency distribution is again created based on all of the numeric value data, the computation unit 40 searches for the median using equation (1), and outputs the found numeric value range to the resolution specifying means 60 as a median. Of course, in the accumulation in equation (1), the computation unit 40 performs accumulation starting not at the count value Cd0 of the count value holding means C0, but rather at the count value CdL of the count value holding means CL, and then the count value Cd0 of the count value holding means C0. The count value CdU of the count value holding means CU is added last.

Thus the counting means 51 increments the count value holding means CL if the numeric value data read from the memory 20 are less than the previously determined numeric value range containing the median; and increments the count value holding means CU if they are greater than the previously determined numeric value range containing the median. Next, the computation unit 40 performs cumulative computation on the count value holding means CL, then C0 through C15, then CU, in searching for the median. Accordingly, in contrast to the apparatus in FIG. 4, prior to searching for the median, the computation unit 40 does not need to determine the number of pieces of numeric value data by adding the count value holding means C0 through C15. Therefore, it is possible to search for the median more rapidly.

Third Embodiment

Figure 9:
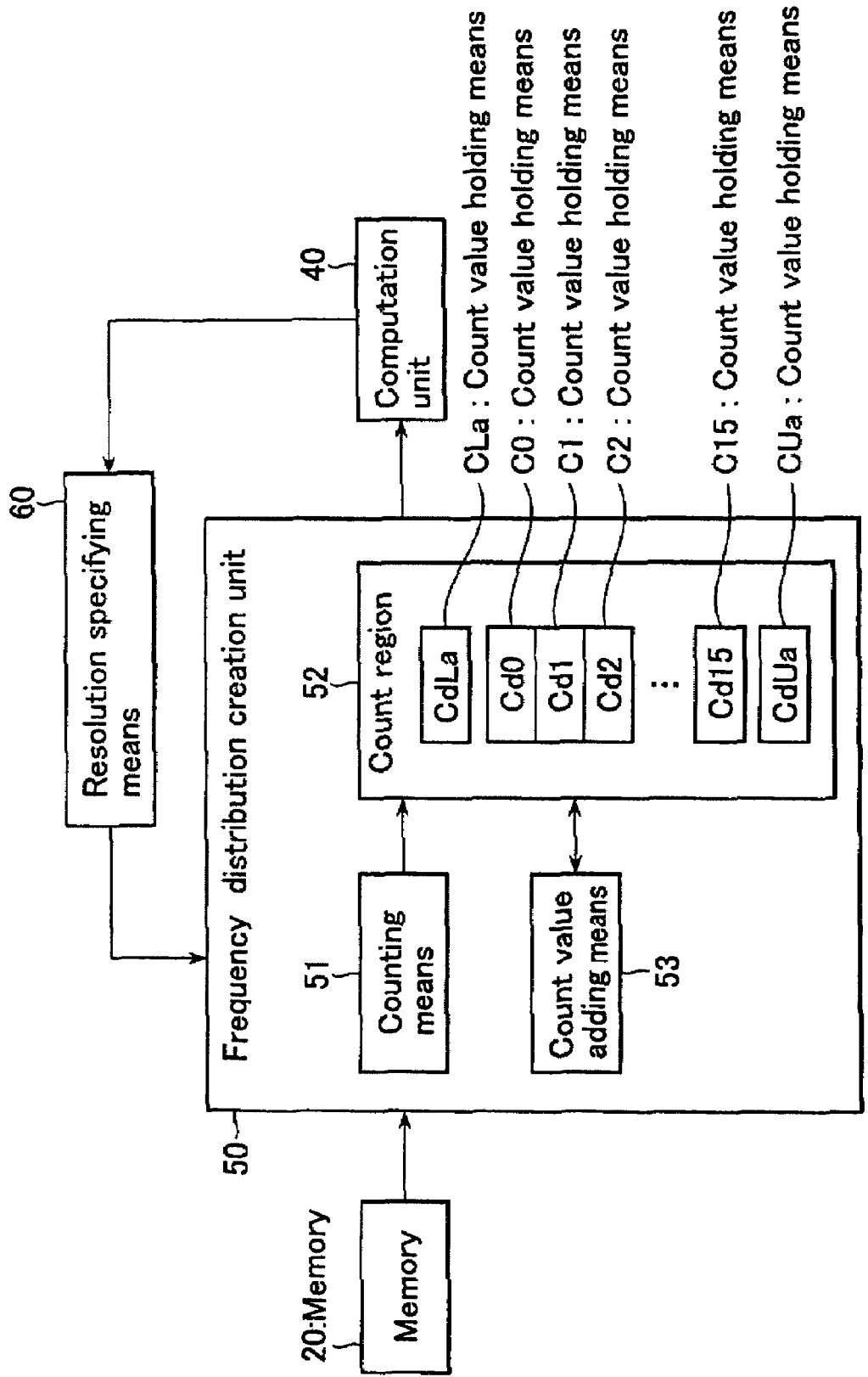
FIG. 9 is a block diagram illustrating a third embodiment of the present invention.

FIG. 9 is a block diagram illustrating a third embodiment of the present invention. In this case, areas which are the same as in FIG. 4 are denoted by identical symbols and are not described. In FIG. 9, new count value holding means CLa and CUa are disposed in the data count region 52 of the frequency distribution creation unit 50, for holding added count values. A new count value adding means 53 is disposed in the frequency distribution creation unit 50, for adding the count values present in a range of numeric values less than the previously determined numeric value range containing the median, and storing the added count values in the count value holding means CLa. In addition, the count value adding means 53 adds the count values present in a range of numeric values greater than the previously determined numeric value range containing the median, and stores the added count values in the count value holding means CUa.

The operations of this type of apparatus will now be described.

This type of apparatus is nearly the same as the apparatus shown in FIG. 4 in terms of operations. The difference in terms of operations is that in the creation of the second and subsequent frequency distributions, before the count values of the count value holding means C0 through C15 are cleared by the counting means 51, the count value adding means 53 adds the count values present in a range of numeric values less than the previously determined numeric value range containing the median, and stores the added count values in the count value holding means CLa. For example, in FIG. 5, the count value obtained by adding the count values Cd0 and Cd1 of the count value holding means C0 and C1, respectively, is stored. In addition, the count value adding means 53 adds the count values present in a range of numeric values greater than the previously determined numeric value range containing the median, and stores the added count values in the count value holding means CUa. For example, in FIG. 5, the count value obtained by adding the count values Cd3 through Cd15 of the count value holding means C3 through C15, respectively, is stored.

Next, after the frequency distribution is again created based on all of the numeric value data, the computation unit 40 searches for the median using equation (1), and outputs the found numeric value range to the resolution specifying means 60 as a median. Of course, in the accumulation in equation (1), the computation unit 40 performs accumulation starting not at the count value Cd0 of the count value holding means C0, but rather at the count value CdLa of the count value holding means CLa, and then the count value Cd0 of the count value holding means C0. The count value CdUa of the count value holding means CUa is added last.

Thus before the count values of the count value holding means C0 through C15 are cleared by the counting means 51, the count value adding means 53 adds the count values outside the previously determined numeric value range containing the median, and stores them in the count value holding means CLa and CUa. Next, the computation unit 40 performs cumulative computation starting with the count value holding means CLa, then C0 through C15, then CUa, in searching for the median. Accordingly, in contrast to the apparatus in FIG. 4, prior to searching for the median, the computation unit 40 does not need to determine the number of pieces of numeric value data by adding the count value holding means C0 through C15. Therefore, it is possible to search for the median more rapidly.

Fourth Embodiment

Figure 10:
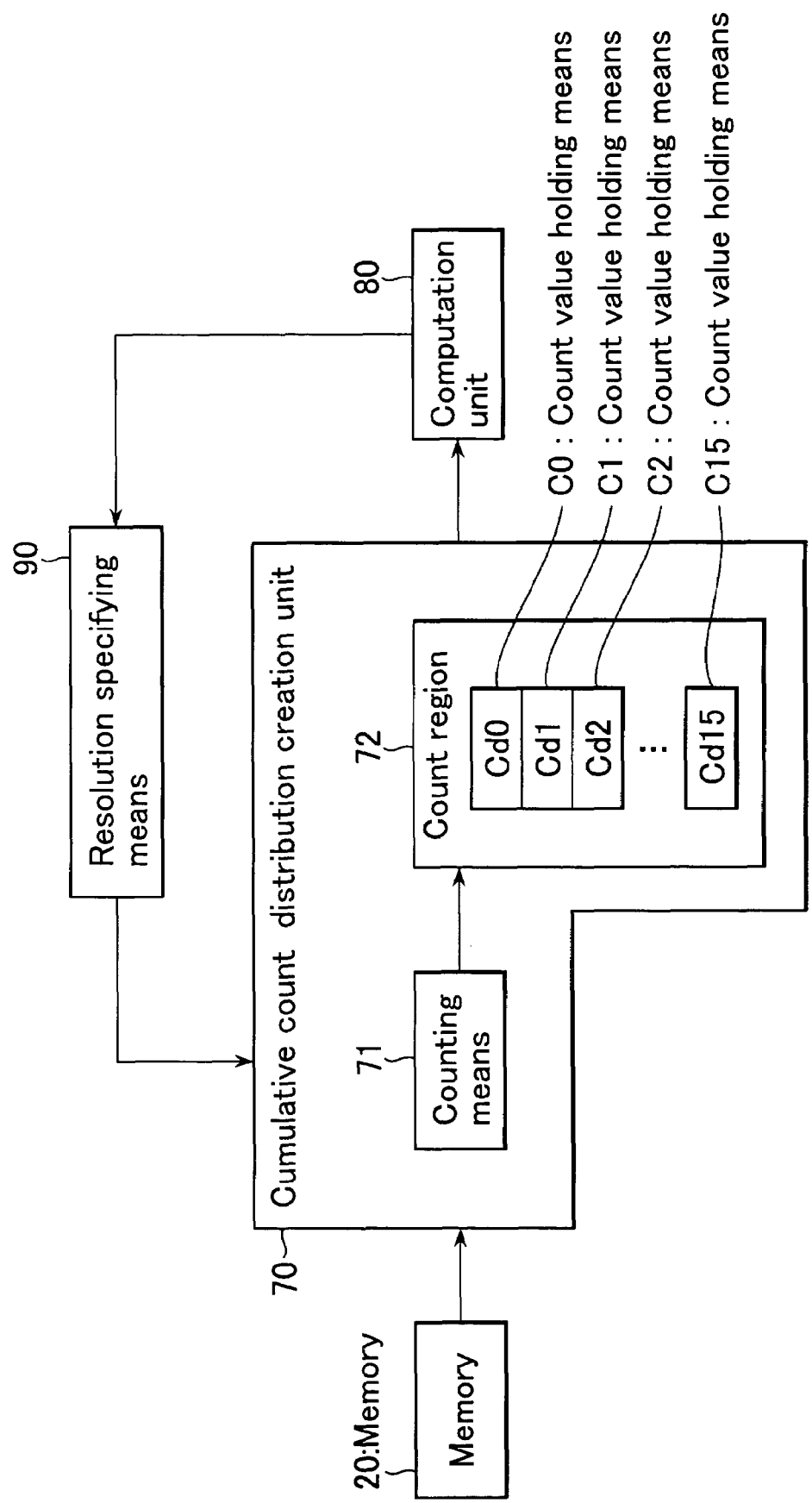
FIG. 10 is a block diagram illustrating a fourth embodiment of the present invention.

FIG. 10 is a block diagram illustrating a fourth embodiment of the present invention. In this case, areas which are the same as in FIG. 4 are denoted by identical symbols and are not described. In FIG. 10, the memory 20 stores numeric value data that have been digitized at a resolution of 16 bits; the number of different numeric value data values which may be taken is 65,536. An example of a numeric value data range is the integers from 0 to 65,535.

A cumulative count distribution creation unit 70 is disposed in lieu of the frequency distribution creation unit 50, and comprises a counting means 71 and data count region 72. It reads numeric value data from the memory 20 at a specified resolution and creates a cumulative count distribution. The counting means 71 increments or clears the corresponding data count region 72 count value based on the numeric value data read from the memory 20. The data count region 72 comprises a number of count value holding means, C0 through C15, such as 16, corresponding to the specified resolution; they are counted or cleared by the counting means 71, and hold count values.

A computation unit 80 is disposed in lieu of the computation unit 40. It computes the median from the count values of the count value holding means C0 through C15 in the data count region 72 of the cumulative count distribution creation unit 70.

A resolution specifying means 90 is disposed in lieu of the resolution specifying means 60. It specifies, to the cumulative count distribution creation unit 70, the resolution for creating the cumulative count distribution based on the median determined by the computation unit 80.

The operations of such an apparatus will now be described.

The counting means 71 clears to "0" all of the count values of the count value holding means C0 through C15 of the data count region 72. After the clearing, the resolution specifying means 90 instructs the cumulative count distribution creation unit 70 to create the first cumulative count distribution at a resolution of, for example, the first four bits in the numeric value data.

Next, the cumulative count distribution creation unit 70, following the instruction from the resolution specifying means 90, assigns a numeric value range to the count value holding means C0 through C15 of the data count region 72, after which the counting means 71 of the cumulative count distribution creation unit 70 reads the numeric value data from the memory 20 and increments a count value of the count value holding means C0 through C15 of the data count region 72 in the resolution of the specified first four bits, as shown in FIG. 11. FIG. 11 is a diagram illustrating the numeric value range (level width) for creating the cumulative count distribution at the resolution specified by the resolution specifying means 90, as well as the count value holding means C0 through C15 corresponding to the numeric value range.

Thus the numeric value ranges corresponding to the individual count value holding means C0 through C15 are 0000(16) to 0FFF(16) for the count value holding means C0; 0000(16) to 1FFF(16), in which the numeric value range for the first 4 bits is greater than that of the count value holding means C0, for the count value holding means C1; 0000(16) to 2FFF(16), in which the numeric value range for the first 4 bits is greater than that of the count value holding means C1, for the count value holding means C2; and thereafter in the same manner, 0000(16) to FFFF(16), in which the numeric value range for the first 4 bits is greater than that of the count value holding means C14, for the count value holding means C15.

Therefore, because the apparatus shown in FIG. 4 creates a count distribution, the numeric value ranges corresponding to the count value holding means C0 through C15 do not overlap. However, because the apparatus shown in FIG. 10 creates a cumulative count distribution, the lower limit values of the respective levels of the count value holding means C0 through C15 are the same 0000(16), whereas their upper limit values increase by the first 4 bits.

Next, the counting means 71 compares the numeric value data read from the memory 20 and the upper limit values of the count value holding means C0 through C15, and increments the count value holding means C0 through C15 in which the upper limit values are equal to the numeric value data, as well as the count value holding means C0 through C15 which are less than the upper limit values. Specifically, the counting means 71 increments the count value holding means C0 through C15 for numeric value data in the range of 0000(16) to 0FFF(16); increments the count value holding means C1 through C15 for numeric value data in the range of 1000(16) to 1FFF(16); increments the count value holding means C2 through C15 for numeric value data in the range of 2000(16) to 2FFF(16); and thereafter in the same manner increments just the count value holding means C15 for numeric value data in the range of F000(16) to FFFF(16).

Figure 12:
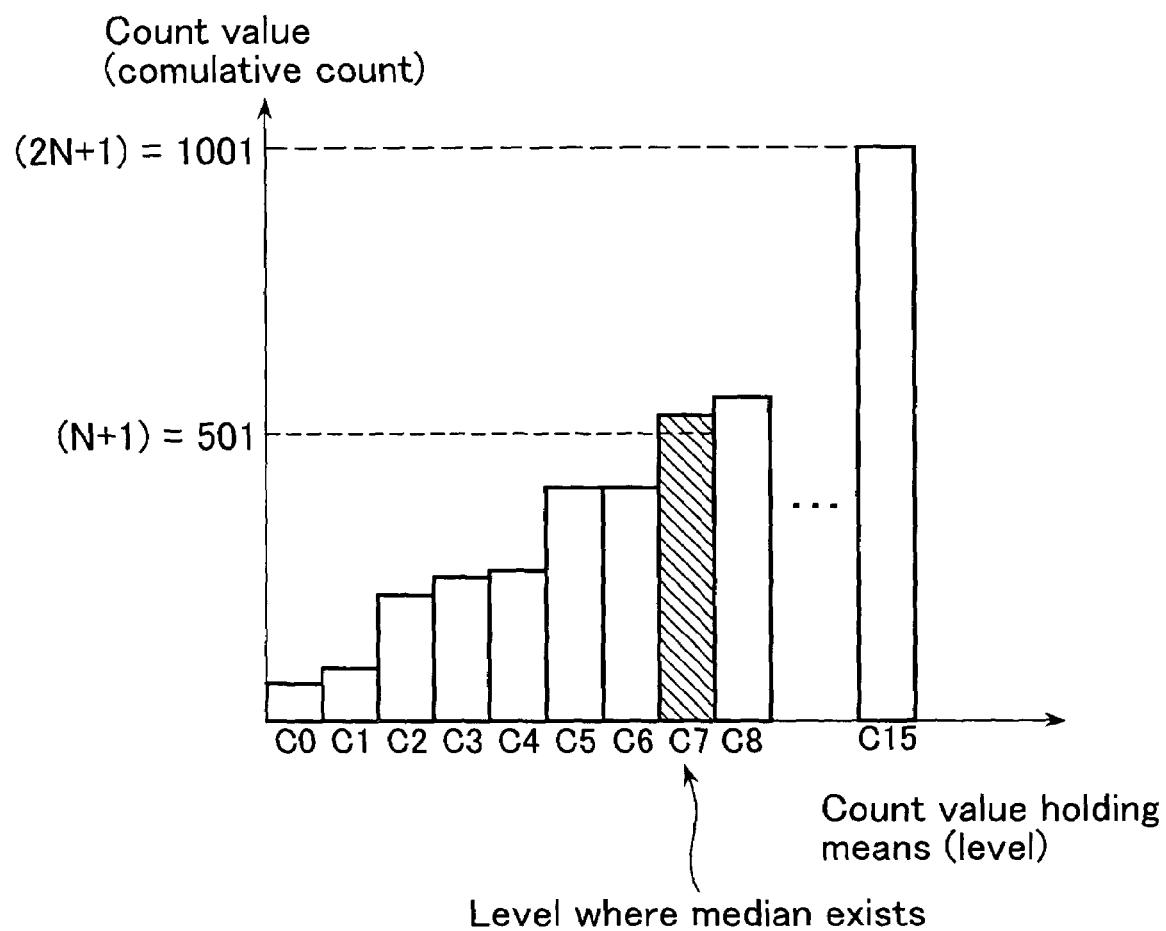
FIG. 12 is a diagram illustrating an example of the cumulative count distribution in the apparatus shown in FIG. 10.

In this manner, the counting means 71 increments the count values of the count value holding means C0 through C15 of the data count region 72 corresponding to the numeric value data. FIG. 12 illustrates an example in which a cumulative count distribution is created using all of the numeric value data. In FIG. 12, there are 1001 pieces of numeric value data. The count value holding means C0 through C15 (levels) are on the horizontal axis, and the count values (cumulative counts) Cd0 through Cd15 of the individual count value holding means C0 through C15 are on the vertical axis.

After the cumulative count distribution is created using all of the data, the computation unit 80 performs computations to determine whether equation (2) below is satisfied, in sequence starting with the count value holding means C0, which has the narrowest numeric value range. It searches for the first count value holding means C0 through C15 satisfying equation (2). Specifically, as is clear from the cumulative count distribution shown in FIG. 12, the numeric value data Cdn, corresponding to the count value holding means Cn (where n is a natural number and $0 \leq n \leq 15$) satisfying equation (2) below, contain the median, which at the (N+1)th place in the (2N+1) pieces of numeric value data.

$$(N+1) \leq Cdn \quad (2)$$

For example, a search is performed using, as the median, the numeric value range of 7000(16) through 7FFF(16), which corresponds to the count value holding means C7. Next, this numeric value range 7000(16) through 7FFF(16) is output to the resolution specifying means 90. It should be noted that although the numeric value range of the count value holding means C7 is 0000(16) through 7FFF(16), the computation unit 80 outputs, to the resolution specifying means 90, the range of 7000(16) through 7FFF(16) as the median, because the median is not present in the numeric value range 0000(16) through 6FFF(16) of the count value holding means C6.

Next, the resolution specifying means 90 raises the resolution another 4 bits in the range 7000(16) to 7FFF(16) of numeric values containing the median, and instructs the cumulative count distribution creation unit 70 to create a second cumulative count distribution with a resolution of the first 8 bits.

Accordingly, the cumulative count distribution creation unit 70 assigns a numeric value range to the count value holding means C0 through C15 of the data count region 72. Next, the counting means 71 of the cumulative count distribution creation unit 70 clears the count values of the count value holding means C0 through C15, then reads the numeric value data from the memory 20 and increments the count values of the count value holding means C0 through C15 of the data count region 72 in the specified resolution of the first 8 bits.

Specifically, the lower limit values of the respective levels of the count value holding means C0 through C15 are the same 0000(16) as the first time, whereas their upper limit values of the individual count value holding means C0 through C15 increase by the first 8 bits in the range of 7000(16) to 7FFF(16), which contains the median.

Thus the numeric value ranges corresponding to the individual count value holding means C0 through C15 are 0000(16) to 70FF(16) for the count value holding means C0; 0000(16) to 71FF(16), in which the numeric value range for the first 8 bits is greater than that of the count value holding means C0, for the count value holding means C1; 0000(16) to 72FF(16), in which the numeric value range for the first 8 bits is greater than that of the count value holding means C1, for the count value holding means C2; and thereafter in the same manner, 0000(16) to 7FFF(16), in which the numeric value range for the first 8 bits is greater than that of the count value holding means C14, for the count value holding means C15.

Next, the counting means 71 increments the count value holding means C0 through C15 for numeric value data in the range of 0000(16) to 70FF(16); increments the count value holding means C1 through C15 for numeric value data in the range of 7100(16) to 71FF(16); increments the count value holding means C2 through C15 for numeric value data in the range of 7200(16) to 72FF(16); and thereafter in the same manner increments just the count value holding means C15 for numeric value data in the range of 7F00(16) to 7FFF(16).

After the cumulative count distribution is again created based on all of the numeric value data in this manner, the computation unit 80 searches for the median using equation (2), and outputs the found numeric value range to the resolution specifying means 90 as a median. Of course, the value of (N+1) is "501", which is the same as the value the first time.

Next, the resolution specifying means 90 raises the resolution another 4 bits in the range of numeric values containing the median, and instructs the cumulative count distribution creation unit 70 to create a third cumulative count distribution with a resolution of the first 12 bits.

Thereafter, in the same manner the cumulative count distribution creation unit 70 creates a cumulative count distribution in the specified resolution of the first 12 bits. Next, the computation unit 80 searches for the median, and outputs the found numeric value range to the resolution specifying means 90 as a median.

Accordingly, the resolution specifying means 90 raises the resolution of the numeric value range containing the median another 4 bits, and instructs the cumulative count distribution creation unit 70 to create a fourth cumulative count distribution in a resolution of 16 bits, which is the same as that in which the numeric value data were digitized. Next, the cumulative count distribution creation unit 70 creates a cumulative count distribution in 16-bit resolution. The computation unit 80 then searches for the median in this cumulative count distribution, and displays the found median on a screen (not shown), or outputs it to an external apparatus (not shown).

Thus the resolution specifying means 90 specifies, to the cumulative count distribution creation unit 70, a resolution which is lower than the resolution of the numeric value data stored in the memory 20, and the cumulative count distribution creation unit 70 creates a cumulative count distribution using this specified resolution. Next, the computation unit 80 determines the median from this cumulative count distribution. In addition, the resolution specifying means 90 again specifies, to the cumulative count distribution creation unit 70, a resolution which is increased based on the computation results of the computation unit 80. The cumulative count distribution is repeatedly created to determine the median until the resolution is the same as that of the numeric value data. Therefore, it is possible to suppress an increase in the number of median search executions, even if the numeric value data resolution is high. Accordingly, it is possible to search for the median rapidly.

For example, in a waveform measurement apparatus which digitizes a measured waveform, converts it to numeric value data, and then performs prescribed waveform analysis and waveform processing, the capacity of the memory 20 which stores the numeric value data is a prescribed amount, and the number of pieces of numeric value data that can be stored is fixed. However, because it is possible to rapidly search for the median in the numeric value data of the memory 20, it is difficult for the memory 20 to reach full capacity, and it is possible to perform continuous waveform measurements without interruptions.

In addition, because the count value holding means C0 through C15 in the data count region 72 do not need to be of a quantity commensurate with the numeric value data resolution ($2^{16}$=65,536), it is possible to reduce the data count region 52. Accordingly, it is possible to reduce size and minimize costs.

In addition, in contrast to the apparatuses shown in FIGS. 4, 7, and 9, the cumulative count distribution creation unit 70 creates a cumulative count distribution. Thus the computation unit 80 does not need to perform cumulative computation, making it possible to perform the median search more rapidly.

Furthermore, in the second and subsequent computations, the computation unit 80 does not need to add the count values stored in the count value holding means C0 through C15 as in the apparatus shown in FIG. 4, and does not require count value holding means CL, CLa, CU, and CUa, as in the apparatuses shown in FIG. 7 and FIG. 9. Accordingly, it is possible to reduce the apparatus size and minimize costs.

It should be noted that the present invention is not restricted to these, but may also be of the types described below.

(1) In the apparatuses shown in FIGS. 4, 7, 9, and 10, configurations were presented in which the numeric value data are digitized and stored in 16-bit resolution in the memory 20. However, the resolution for digitization may be any prescribed resolution.

(2) In the apparatuses shown in FIGS. 4, 7, 9, and 10, positive integers were presented as an example, but these may be real numbers.

(3) In addition, in the apparatuses shown in FIGS. 4, 7, 9, and 10, configurations were presented in which the resolutions specified by the resolution specifying means 60 and 90 were the first 4 bits, 8 bits, 12 bits, and 16 bits. However, it is permissible to numbers of bits in any prescribed resolution.

(4) In addition, in the apparatuses shown in FIGS. 4, 7, 9, and 10, configurations were presented in which the computation units 40 and 80 search for the median in a frequency distribution or cumulative computation, then display the found median on a screen (not shown) or output it to an external apparatus (not shown). However, it is also permissible for the computation units 40 and 80 to display the numeric value range containing the median on a screen (not shown) or output it to an external apparatus (not shown).

(5) In addition, in the apparatuses shown in FIGS. 4, 7, 9, and 10, configurations were presented in which a median search is performed. However, it is also permissible to search for a numeric value of a prescribed rank.

(6) In addition, in the apparatuses shown in FIGS. 4 and 10, configurations were presented in which the data count regions 52 and 72 comprise 16 count value holding means C0 through C15. However, it is also permissible to dispose a quantity exceeding the resolution specified by the resolution specifying means 60 and 90. Likewise, any number of count value holding means may be disposed in FIGS. 7 and 9.

Figure 13:
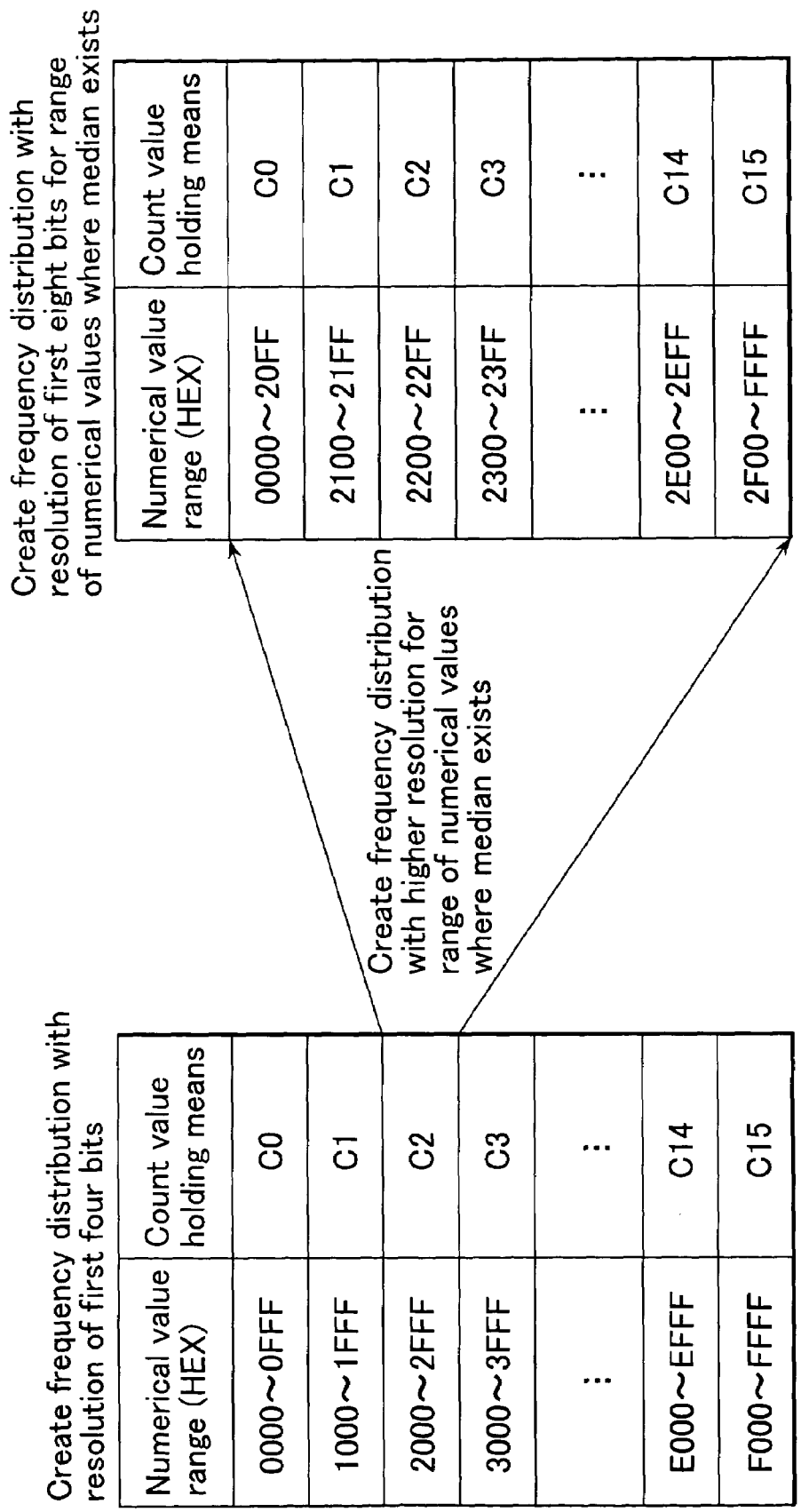
FIG. 13 is a diagram illustrating another example of correspondences between the numeric value range of the apparatus shown in FIG. 4, and the count value holding means C0 through C15.

(7) In addition, in the apparatus shown in FIG. 4, a condition is presented in which the frequency distribution creation unit 50 sets even intervals for the frequency distribution level width as shown in FIG. 5. However, it is also permissible, starting with the second time, to do as shown in FIG. 13, without using equal intervals. Specifically, it is permissible to always set the lower limit value of the count value holding means C0 to 0000(16), and to set the upper limit value of the count value holding means C15 to FFFF (16). Accordingly, it is not necessary to add the count values stored in the count value holding means C0 through C15 as in the apparatus shown in FIG. 4, and it is not necessary to use the count value holding means CL, CLa, CU, and CUa as in the apparatuses shown in FIGS. 7 and 9. Accordingly, it is possible to reduce size and minimize costs.

(8) In addition, in the apparatuses shown in FIGS. 4, 7, and 9, configurations were presented in which the computation unit 40 performs cumulative computation starting with the count value of the count value holding means C0 through C15, CL, CLa, CU, and CUa having the smallest value (e.g., count value holding means C0 for the apparatus shown in FIG. 4). However, it is also permissible to perform the cumulative computation starting with the one having the largest value.

(9) In addition, in the apparatus shown in FIG. 10, a configuration was presented in which the lower limit values of the levels of the individual count value holding means C0 through C15 are the same 0000(16), and the upper limit values are set as different values. However, it is also permissible to use a configuration in which the upper limit values are the same FFFF(16), and the lower limit values are set as different values.

The present invention provides effects such as the following.

The resolution specifying means specifies, to the frequency distribution creation unit, a resolution which is less than the resolution of the numeric value data stored in the memory, and the frequency distribution creation unit creates the frequency distribution using this specified resolution. Next, the computation unit determines a numeric value range or numeric value with a prescribed rank from the frequency distribution. In addition, the resolution specifying means again specifies, to the frequency distribution creation unit, a resolution which is increased based on the computation results of the computation unit. Next, the frequency distribution is repeatedly created in searching for the numeric value of the prescribed rank until the resolution is the same as that of the numeric value data. Thus it is possible to suppress an increase in the number of numeric value search executions, even if the numeric value data resolution is high. Accordingly, it is possible to rapidly search for a numeric value with a prescribed rank.

The count value addition means adds count values outside the numeric value range containing the median, storing them in the count value holding means, and the computation unit performs cumulative computation on the count value holding means to search for the median. Accordingly, in contrast to the apparatus shown in FIG. 4, before searching for the median the computation unit does not need to perform addition on the count value holding means in order to determine the number of pieces of numeric value data, and search for the median thereafter. Therefore, it is possible to search for the median more rapidly.

The resolution specifying means specifies a resolution which is less than the resolution of the numeric value data stored in the memory, and the frequency distribution is created using this specified resolution. Next, a numeric value range or numeric value with a prescribed rank is determined from the determined frequency distribution. In addition, because the specified resolution is raised in steps based on the numeric value range with the prescribed rank, it is possible to suppress an increase in the number of numeric value search executions even if the numeric value data resolution is high. Accordingly, it is possible to rapidly search for the numeric value with the prescribed rank.

The resolution specifying means specifies, to the cumulative count distribution creation unit, a resolution which is less than the resolution of the numeric value data stored in the memory, and the cumulative count distribution creation unit creates the cumulative count distribution using this specified resolution. Next, the computation unit determines a numeric value range or numeric value with a prescribed rank from the cumulative count distribution. In addition, the resolution specifying means again specifies, to the cumulative count distribution creation unit, a resolution which is increased based on the computation results of the computation unit. Next, the cumulative count distribution is repeatedly created in searching for the numeric value of the prescribed rank until the resolution is the same as that of the numeric value data. Thus it is possible to suppress an increase in the number of numeric value search executions, even if the numeric value data resolution is high. Accordingly, it is possible to rapidly search for a numeric value with a prescribed rank.

In addition, because the cumulative count distribution creation unit creates a cumulative count distribution, the computation unit does not need to perform cumulative computation. Thus it is possible to search for the numeric value range or numeric value of the prescribed rank more rapidly.

The resolution specifying means specifies a resolution which is less than the resolution of the numeric value data stored in the memory, and the cumulative count distribution is created using this specified resolution. Next, a numeric value range or numeric value with a prescribed rank is determined from the determined cumulative count distribution. In addition, because the specified resolution is raised in steps based on the numeric value range with the prescribed rank, it is possible to suppress an increase in the number of numeric value search executions even if the numeric value data resolution is high. Accordingly, it is possible to rapidly search for the numeric value with the prescribed rank.

In addition, a cumulative count distribution is created and the numeric value range or numeric value with the prescribed rank is searched for from this cumulative count distribution. Therefore, it is not necessary to perform cumulative computation, and the numeric value of the prescribed rank can be searched for more rapidly.

What is claimed is:

1. A numeric value search apparatus characterized in that it comprises the following:
    a storage unit which stores multiple pieces of digitized numeric value data;
    a resolution specifying means which specifies a frequency distribution resolution;
    a frequency distribution creation unit which determines the frequency distribution of numeric value data in the aforementioned storage unit using the resolution specified by this resolution specifying means; and
    a computation unit which determines the numeric value range or numeric value with the prescribed rank from the frequency distribution determined by this frequency distribution creation unit.

2. The numeric value search apparatus of claim 1, wherein the aforementioned resolution specifying means increases the resolution specified to the aforementioned frequency distribution creation unit in steps, based on the computation results of the aforementioned computation unit.

3. The numeric value search apparatus of claim 1, characterized in that the frequency distribution creation unit comprises the following:
    a data count region which comprises multiple count value holding means for holding count values; and
    a counting means which reads the numeric value data of the aforementioned storage unit, and increments the count values of the count value holding means in the aforementioned data count region corresponding to the read numeric value data.

4. The numeric value search apparatus of claim 3, characterized in that the frequency distribution creation unit comprises a count value addition means which adds the number of pieces of numeric value data outside the range of numeric values of the prescribed rank, and stores them in the aforementioned count value holding means.

5. The numeric value search apparatus of any of the claims 1 through 4, characterized in that the computation unit performs cumulative computation.

6. The numeric value search apparatus of any of the claims 1 through 4, characterized in that the computation unit determines a median.

7. The numeric value search apparatus of any of the claims 1 through 4, characterized in that it is used in a waveform measurement apparatus which digitizes a measured waveform, converts it to numeric value data, and performs prescribed analysis and waveform processing.

8. A numeric value search method characterized in that it comprises the following:
    a procedure which specifies a frequency distribution resolution;
    a procedure which determines the frequency distribution of a digitized numeric value data in the storage unit, using this specified resolution; and
    a procedure which determines the numeric value range or numeric value with the prescribed rank from this determined frequency distribution.

9. The numeric value search method of claim 8, wherein the specified resolution is increased in steps based on the range of numeric values of the prescribed rank.

10. A numeric value search apparatus characterized in that it comprises the following:
    a storage unit which stores multiple pieces of digitized numeric value data;
    a resolution specifying means which specifies a cumulative count distribution resolution;

a cumulative count distribution creation unit which determines the cumulative count distribution of numeric value data in the aforementioned storage unit using the resolution specified by this resolution specifying means; and a computation unit which determines the numeric value range or numeric value with the prescribed rank from the cumulative count distribution determined by this cumulative count distribution creation unit.

11. The numeric value search apparatus of claim 10, wherein the aforementioned resolution specifying means increases the resolution specified to the aforementioned cumulative count distribution creation unit in steps, based on the computation results of the aforementioned computation unit.

12. The numeric value search apparatus of claim 10, characterized in that the cumulative count distribution creation unit comprises the following:

a data count region which comprises multiple count value holding means for holding count values; and a counting means which reads the numeric value data of the aforementioned storage unit, and increments the count values of the count value holding means in the aforementioned data count region corresponding to the read numeric value data.

13. The numeric value search apparatus of claim 10 or 12, characterized in that the computation unit determines a median.

14. The numeric value search apparatus of claim 10 or 12, characterized in that it is used in a waveform measurement apparatus which digitizes a measured waveform, converts it to numeric value data, and performs prescribed analysis and waveform processing.

15. A numeric value search method characterized in that it comprises the following:

a procedure which specifies a cumulative count distribution resolution;

a procedure which determines the cumulative count distribution of a digitized numeric value data in the storage unit, using this specified resolution; and a procedure which determines the numeric value range or numeric value with the prescribed rank from this determined cumulative count distribution.

16. The numeric value search method of claim 15, wherein the specified resolution is increased in steps based on the range of numeric values of the prescribed rank.

* * * * *